United States Patent
Rajendran et al.

(10) Patent No.: US 8,625,592 B2
(45) Date of Patent: Jan. 7, 2014

(54) BLADE SWITCH WITH SCALABLE INTERFACES

(75) Inventors: Saravanakumar Rajendran, San Jose, CA (US); Michael Smith, San Jose, CA (US); Dileep Kumar Devireddy, San Jose, CA (US); Pradeep K. Kathail, Los Altos, CA (US); Chandrashekhar Appanna, Cupertino, CA (US); Jeffrey Ym Wang, Saratoga, CA (US); Prashant P. Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 655 days.

(21) Appl. No.: 12/037,525

(22) Filed: Feb. 26, 2008

(65) Prior Publication Data
US 2009/0213869 A1  Aug. 27, 2009

(51) Int. Cl.
*H04L 12/54* (2013.01)

(52) U.S. Cl.
USPC ........... 370/392; 370/419; 709/220; 709/223; 715/735

(58) Field of Classification Search
None
See application file for complete search history.

(56) References Cited

U.S. PATENT DOCUMENTS

| | | | | |
|---|---|---|---|---|
| 5,812,771 | A | * | 9/1998 | Fee et al. ........................ 709/201 |
| 6,735,198 | B1 | * | 5/2004 | Edsall et al. ................... 370/389 |
| 7,417,987 | B2 | * | 8/2008 | Shenoy et al. ................. 370/389 |
| 2002/0103921 | A1 | * | 8/2002 | Nair et al. ...................... 709/232 |
| 2003/0235195 | A1 | * | 12/2003 | Shenoy et al. ................. 370/389 |
| 2004/0199568 | A1 | | 10/2004 | Lund |
| 2005/0074003 | A1 | * | 4/2005 | Ball et al. ....................... 370/389 |
| 2005/0169281 | A1 | * | 8/2005 | Ko et al. ........................ 370/400 |
| 2006/0221972 | A1 | | 10/2006 | Bhargava et al. |
| 2007/0291654 | A1 | * | 12/2007 | Pepper ........................... 370/252 |
| 2008/0117909 | A1 | * | 5/2008 | Johnson ......................... 370/392 |

FOREIGN PATENT DOCUMENTS

WO   2005029784 A2   3/2005

OTHER PUBLICATIONS

PCT International Search Report and Written Opinion dated Aug. 11, 2009.

* cited by examiner

*Primary Examiner* — Brian Roberts
(74) *Attorney, Agent, or Firm* — Patterson & Sheridan, LLP

(57) ABSTRACT

A blade switch for increased interface scalability is provided. The blade switch may address interface scalability by having each of the switch linecards manage its interfaces locally and may use the concept of virtual and local interfaces for intelligent forwarding. The blade switch may appear as a single network switch having a single bridge ID from the network perspective during operation and from the customer perspective during configuration.

19 Claims, 3 Drawing Sheets

BLADE SWITCH WITH SCALABLE INTERFACES

BACKGROUND OF THE INVENTION

1. Field of the Invention

Embodiments of the present invention generally relate to the field of network communication, and more particularly, to interface scalability when increasing the number of switch linecards within a single chassis.

2. Description of the Related Art

As the number of clients or network nodes having destination IP addresses increases for an Internet Service Provider (ISP) or a growing large company, network complexity and, thus, the demand for more router and switch interfaces also scale accordingly. Switching systems containing several slots for connecting switch linecards have been designed in an effort to meet the demand for network switches with a large number of interfaces, both physical and logical. However, scalability in terms of the number of interfaces and associated operations supported by a single network switch remains a problem.

Accordingly, techniques for successfully scaling the number of interfaces within a network switching system are needed.

OVERVIEW

Embodiments of the present invention generally relate to network switching systems for addressing interface scalability.

One embodiment of the present invention provides a network switch system. The system generally includes a chassis; a plurality of switch linecards disposed in the chassis and functioning as independent Layer 2 (L2) switches, wherein each of the switch linecards maintains control, forwarding, and interface management functions locally; and a controller, wherein the controller is adapted to configure the plurality of switch linecards as a single network device having a single bridge identifier (bridge ID).

Another embodiment of the present invention provides a method. The method generally includes receiving a packet in a first switch linecard of a plurality of switch linecards disposed in a chassis, wherein the plurality of switch linecards is configured as a single network switch having a single bridge ID, and forwarding the packet from the first switch linecard to a second switch linecard via a virtual interface.

Yet another embodiment of the present invention provides a method. The method generally includes configuring a forwarding information base (FIB) of a first switch linecard of a plurality of switch linecards disposed in a chassis to forward a packet to a local interface of the first switch linecard if the packet is to be forwarded within the first switch linecard and configuring the FIB of the first switch linecard to forward the packet from the first switch linecard to a virtual interface for bridging between two or more of the plurality of switch linecards if the packet is to be forwarded to a second switch linecard in the plurality.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

Embodiments of the present invention provide a blade switch to address interface scalability and permit an increased number of switch linecards supported within a single chassis.

An Example Blade Switch

Figure 1:
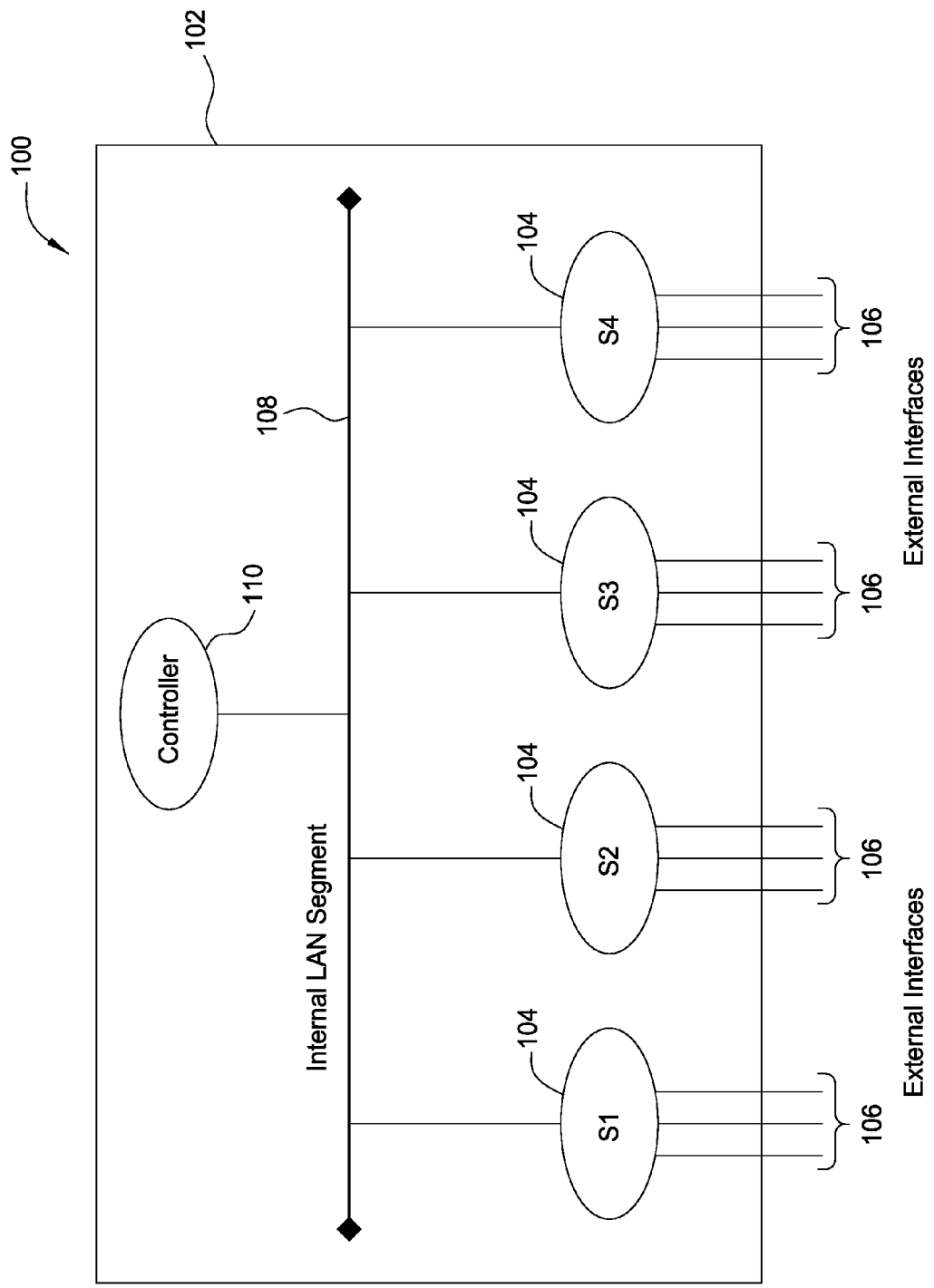
FIG. 1 is a block diagram of a switching network-in-a-box in accordance with an embodiment of the present invention.

FIG. 1 is a block diagram of an example blade switch 100 according to an embodiment of the invention. The blade switch 100 may comprise a chassis 102 having a backplane and a plurality of slots. Switch linecards 104 (also known as switch blades and labeled S1-S4 in FIG. 1) may be disposed in the slots of the chassis 102 and electrically coupled to the backplane, typically through plug-in interfaces. The number of slots may dictate the number of switch linecards 104 the chassis 102 may hold. Although only four switch linecards 104 are shown in FIG. 1, this is representative of any number of linecards that may be disposed within a blade switch chassis (e.g., 44 or 128 linecards). Moreover, an operable blade switch may have empty slots where the chassis 102 has more available slots than switch linecards 104 used for a given application.

Each switch linecard 104 may have a plurality of external interfaces 106 for coupling the switch linecard 104 to an external network, such as a router, an external bridge, a server, or a client. These external interfaces 106 may be for wireless transmission or physical electrical connection to any suitable cable, such as Cat-5 cable, for high-speed data transmission. The physical external interfaces 106 and any logical interfaces for a given switch linecard 104 may be considered as the local interfaces for that switch linecard 104. Each switch linecard 104 may also be coupled to an internal local area network (LAN) segment 108 for routing between the linecards 104. Physically, the internal LAN segment 108 may be located within the backplane (e.g., as a trace within the printed circuit board (PCB) of the backplane), and the individual switch linecards 104 may be coupled to the internal LAN segment 108 by being connected to the backplane.

Furthermore, a controller 110 may be coupled to the switch linecards 104 in an effort to manage and configure the routing information for the individual switch linecards 104. To manage the switch linecards 104, the controller 110 may run an operating system. The controller 110 may be disposed within a separate area of the chassis 102 from the switch linecards 104 or have a designated slot. For some embodiments, the controller 110 may be coupled to the linecards 104 via the internal LAN segment 108 as shown.

The chassis 102 may be composed of any suitable material, such as metal, for providing a rigid structure in which to contain and protect elements disposed within (e.g., the switch linecards 104) and for acting as a Faraday shield against electrical noise. For some embodiments, the chassis 102 may also contain one or more fans (not shown) in an effort to provide air circulation and, thus, forced convective cooling of the switch linecards 104. Furthermore, a power supply (not shown) may be disposed within the chassis 102 and may serve to convert AC power, such as 120 $V_{rms}$ from a wall outlet, to one or more DC voltages for use by the switch linecards 104, the controller 110, and the fan(s). The power supply may be coupled to the backplane for power distribution to the switch linecards 104 and the controller 110.

In the blade switch 100, each switch linecard 104 may own the interfaces locally. In other words, each switch linecard 104 may store and maintain its own forwarding information base (FIB), also known as a forwarding table, for making switching/routing decisions. Hence, the controller 110 need not control the data packets during operation of the blade switch 100. This is in contrast to conventional systems where the controller typically distributes the FIB to the blades and controls the data switching. Used to find the proper interface to which an input interface should send a packet to be transmitted by the switch linecard, the FIB may be directed toward fast lookup of destination addresses. From a data plane perspective, the blade switch 100 may behave substantially similar to a single network switch in a network, even though there may tens to hundreds of switch linecards 104 contained within the chassis 102, thereby leading to the concept of a "network-in-a-box" so to speak. By conceptually having all of the switch linecards in the chassis 102 function as a single network switch, the system software may be scaled to support a large number of interfaces.

To configure the blade switch 100, the customer may interface with the controller 110, which handles the global aspects of the blade switch 100, via software, such as the controller's operating system. From the customer, control plane, and data plane perspectives, the blade switch 100 may appear and behave as a single network switch having a single bridge identifier (bridge ID). However, once the customer has completed configuration of the blade switch 100, the FIB for each switch linecard 104 may be updated and stored locally. For some embodiments, the controller 110 may act as a router and download the FIB contents into the switches. The blade switch 100 may configure only a single virtual interface, such as the internal LAN segment 108, for the network fabric within the chassis 102.

With the virtual interface configured by the controller 110, the blade switch 100 may employ intelligent forwarding through the fabric by dividing the routes into two groups: local interfaces and virtual interfaces. Local interfaces, as used herein, may be generally defined as interfaces (both physical and logical) that are local to a given switch linecard 104. A virtual interface, as used herein, may be generally defined as an interface for the blade switch model that identifies the shared segment connecting the linecards. With these two groups, the intelligent forwarding may be known as two-stage, or split, forwarding. Based on the destination, the FIB for each switch linecard 104 may indicate routing incoming data packets to a local interface, local to that particular linecard, or to the virtual interface for routing to another switch linecard 104 within the chassis 102 of the blade switch 100.

In other words, the virtual interface may be a global internal virtual LAN (VLAN) used for bridging across the linecards 104. These local and virtual interfaces may operate on Layer 2 (L2, the data link layer) of the Open Systems Interconnection Reference Model (OSI model). Conventionally on a shared LAN segment, the data packets are received by every node on the segment. With intelligent forwarding, however, packet forwarding is performed as if the linecards are connected with point-to-point links, which will be described in further detail below. Furthermore, mechanisms may be implemented in an effort to ensure that the internal routes of the virtual interface are preferred over any possible routes existing outside of the blade switch's chassis 102.

With the concept of intelligent forwarding, local switching within a certain switch linecard 104 in the blade switch 100 may most likely have the same performance as in a conventional switching system with the same switch linecard. However, because of the two lookups in intelligent forwarding when packets are routed between linecards in the blade switch 100, the performance may be slightly reduced when compared to a conventional switching system with the same switch linecards. However, the scalability advantage may outweigh the slight performance reduction for certain applications.

By localizing the switching decisions for a linecard in the blade switch 100, each of the switch linecards 104 may run a separate instance of an operating system, such as Cisco's Internetwork Operating System (IOS). Moreover, in the blade switch 100, each of the switch linecards 104 within the chassis 102 may run a different version of the operating system. This may allow for scaling the number of switch linecards 104 in the blade switch 100 in conjunction with operating system feature/code development. Furthermore, because forwarding is localized on each linecard, each of the switch linecards 104 may support a different version of the forwarding engine, such as Cisco's Enhanced Address Recognition Logic (EARL), within the routing application specific integrated circuit (ASIC). In other words, mixed mode EARLs may be supported.

Allowing for different operating systems and different forwarding engines may permit a "pay-as-you-go" model, where customers may upscale their blade switch by adding new switch linecards potentially with upgraded features without discarding legacy linecards. In this manner, scalability is not hindered by the costs of having to replace legacy linecards when upgrading a network switching system, such as the blade switch 100.

Figure 2:
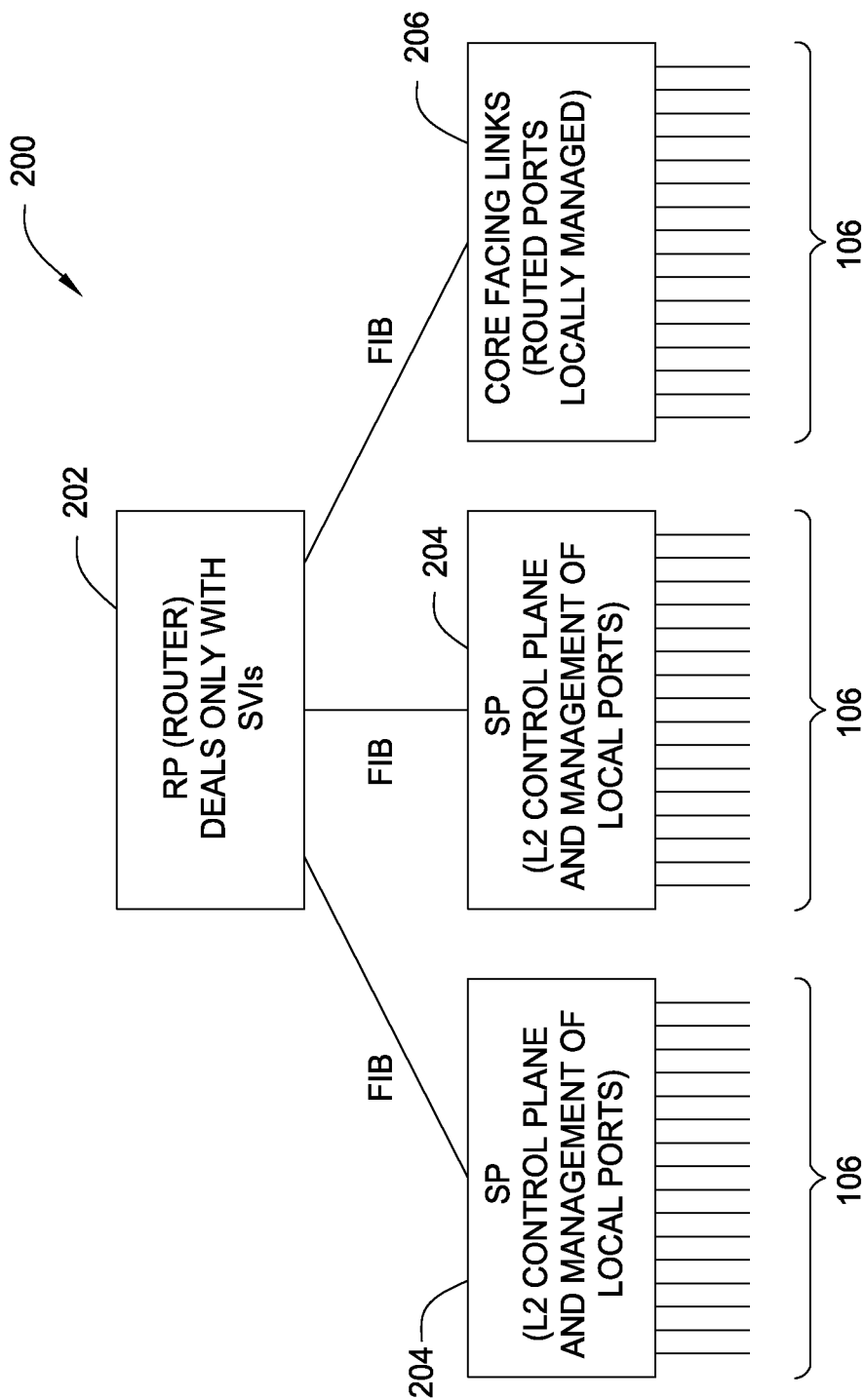
FIG. 2 models the control plane for a blade switch in accordance with an embodiment of the present invention.

Referring now to the control plane model 200 of FIG. 2, ports (including the external interfaces 106) that are aggregated may be L2 ports. Each port may be assigned a private VLAN, and multiple ports may be grouped into a routable VLAN with a switch virtual interface (SVI) defined. An SVI represents a VLAN of switch ports as a single interface to a routing or bridging function of a network switch, such as the blade switch 100.

Routing protocols need not be run on the aggregated ports. Rather, routing protocols may be run in a single place, such as in the route processor (RP) 202, or router. The route processor 202 may be part of the controller 110 of the blade switch 100, or the controller 110 may function as the route processor 202. Since there is one single router control plane and one single router view to the external world, EtherChannels may be supported in the blade switch 100. Each switch linecard 104 may contain a switch processor (SP) 204 for L2 control plane functionality, as well as management of ports local to that particular linecard. In other words, each switch linecard 104 may act like an L2 switch. Each blade may expose a certain number of SVIs to the route processor 202.

The blade switch 100 may also be intended to interface with a number of core-facing uplink ports, and the number of uplink ports (i.e., real routed ports 206) may most likely be much less than the total number of aggregated ports. The routed ports 206, which function on Layer 3 (L3, the network layer) of the OSI model, may most likely reside on a separate switch linecard 104 than the L2 switches. The routed ports 206 may also be locally managed. The physical external interfaces 106 may be scaled by distributing forwarding information to the switch linecards 104, as illustrated by the FIBs (e.g., as part of Distributed Cisco Express Forwarding, or dCEF) being distributed to the switch processors 204 and routed ports 206 in FIG. 2.

From the management plane perspective, the blade switch 100 may be centrally managed at the controller 110, and more specifically, at the route processor 202. The controller 110 may have a single internet protocol (IP) address with session support, and commands and/or features for blade switch management may be executed on the controller 110. Furthermore, some embodiments may include an option to telnet directly to a certain linecard 104 for debugging and network management. In other words, the blade switch 100 may allow a user to connect to the controller 110 and then select an individual switch linecard 104 for management and/or debugging.

For some embodiments, the blade switch 100 may allow a user to connect to the controller 110 and manage either all or a subset of the plurality of switch linecards 104 as a single entity. In the management plane, the blade switch 100 may allow the switch linecards 104 to be partitioned based on the operating system version the linecards are running for some embodiments. By allowing linecards running the same version and image of the operating system to be managed as a single entity, a command translation table need not be maintained. Also for some embodiments, the blade switch 100 may have provisions for specifying a subset of the switch linecards 104 as the destination for specified commands.

An Interface Descriptor Block (IDB) is a special control structure internal to the Cisco IOS software that contains information such as the IP address, interface state, and packet statistics. Cisco IOS software may maintain one IDB for each interface present on a platform. While the L2 IDBs may be local to the switch linecards 104, the SVI IDBs may reside in the route processor 202. L3 commands may be processed locally at the route processor 202, but L2 commands may be sent to one or more switch linecard(s) 104.

In view of the above description, the blade switch 100 may have each of the switch linecards 104 maintain its control/forwarding/management functions locally while appearing as a single switch with a single bridge ID from the customer and network perspectives.

Unicast Forwarding Example

Figure 3:
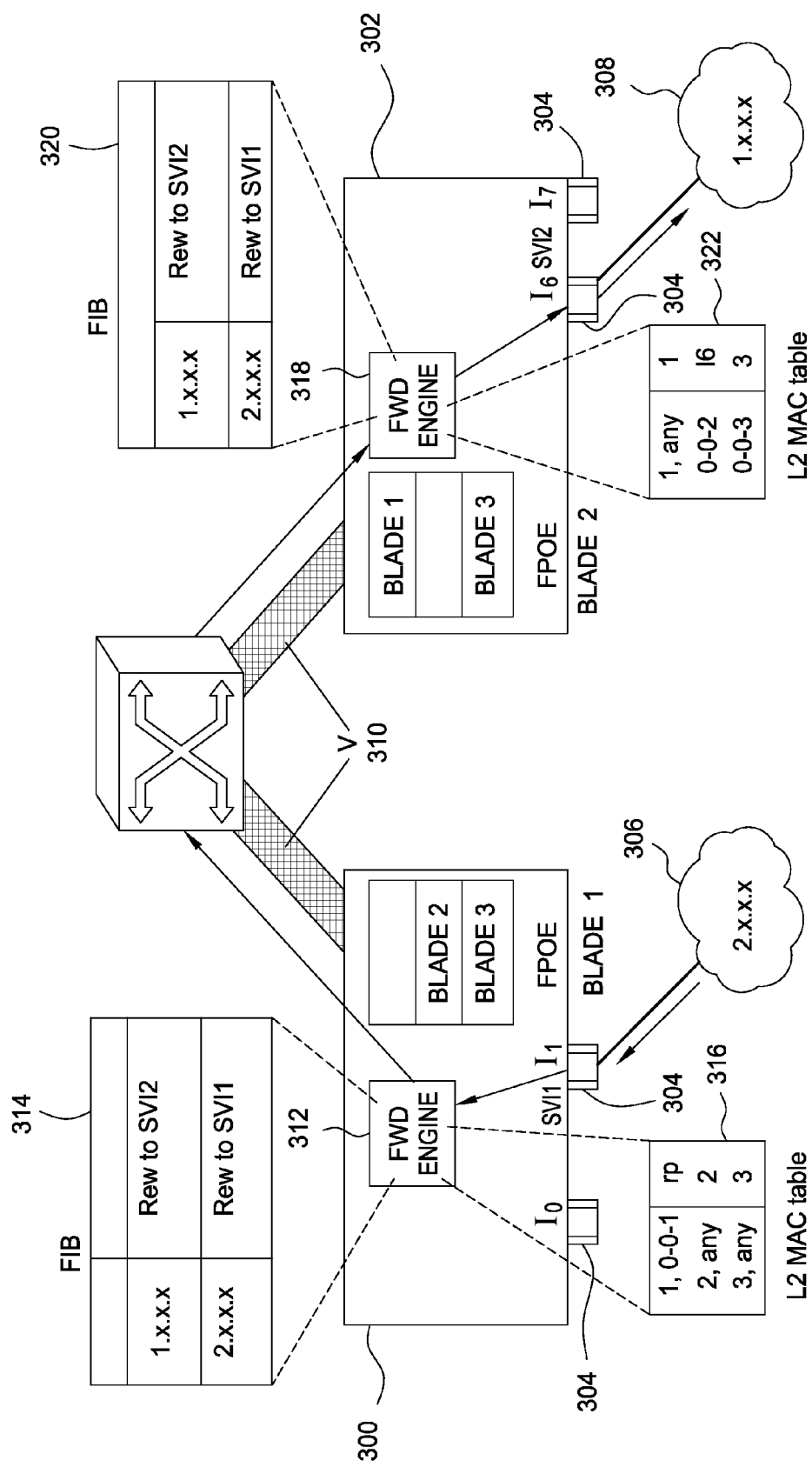
FIG. 3 illustrates blade-to-blade unicast forwarding within the blade switch in accordance with an embodiment of the present invention.

The blade switch 100 may support several different types of linecard-to-linecard (blade-to-blade) forwarding from the data plane perspective. FIG. 3 illustrates blade-to-blade unicast forwarding within the blade switch according to some embodiments of the present invention. In computer networks, unicast forwarding is the sending of data packets to a single destination, and duplicate data streams may be transmitted if more than one destination is to receive a particular data packet.

As depicted in FIG. 3, the blade switch 100 may contain a first switch linecard 300 labeled BLADE 1 and a second switch linecard 302 labeled BLADE 2. The first switch linecard 300 may have two local ports 304 labeled $I_0$ and $I_1$, and the second switch linecard 202 may have two local ports 304 labeled $I_6$ and $I_7$. Although FIG. 3 depicts only two local ports per switch linecard, each linecard may have many more local ports for interfacing with a network external to the blade switch 100. Interface $I_1$ may be coupled to a network 306 having an IP subnet of 2.x.x.x, for example. Interface $I_6$ may be coupled to a network 308 having an IP subnet of 1.x.x.x. The first and second switch linecards 300, 302 may be coupled by the virtual interface (V) 310 for blade-to-blade forwarding.

The forwarding engine 312, such as EARL, within the first switch linecard 300 may contain a forwarding information base (FIB) 314 after configuration of the blade switch 100 that indicates routing incoming data packets to a local interface, such as $I_0$ and $I_1$, to a switch virtual interface (SVI) such as SVI1 or SVI2, or to the virtual interface 310. For example, if a data packet has a destination address in the subnet of 1.x.x.x, there may not be a local interface on BLADE 1 to route the data packet to reach the network 308. Instead the data packet should be routed over the fabric link. Thus, the FIB 314 may contain an entry to rewrite data packets with a destination address in the subnet of 1.x.x.x to the virtual interface 310 based on the Media Access Control (MAC) address of BLADE 2 or, in this case, the SVI associated with the destination network (e.g., SVI2).

The MAC address may be based on the slot number of the switch linecard 104 within the chassis 102 of the blade switch 100 having the correct local port coupled to the destination network. According to the L2 MAC table 316 for the first switch linecard 300 (L2 standing for Layer 2, the data link layer of the OSI model), the MAC address for BLADE 2, the second switch linecard 302, is 2.

The FIB 314 entry for data packets with a destination address in the subnet of 1.x.x.x should be to rewrite data packets to SVI2, through the virtual interface 310, as illustrated. Thus, even though multiple switch linecards may be coupled to the virtual interface 310, the SVI addressing used in conjunction with the virtual interface routing in the first portion of intelligent forwarding allows data packets to be forwarded as if the linecards (such as BLADE 1 and BLADE 2) were connected with point-to-point links.

In a similar manner, the forwarding engine 318, such as EARL, within BLADE 2, the second switch linecard 302, may contain an FIB 320 after configuration of the blade switch 100 that indicates routing incoming data packets to a local interface, such as $I_6$ and $I_7$, to an SVI such as SVI1 or SVI2, or to the virtual interface 310. For example, if a data packet is received in the second switch linecard 302 with a destination address in the subnet of 1.x.x.x, the FIB 320 may contain routing instructions to rewrite the packet to SVI2 (using local interface $I_6$). However, if the data packet has a destination address in the subnet of 2.x.x.x, there may not be a local interface on BLADE 2 to route the data packet to reach the network 306. Thus, the FIB 320 may contain an entry to rewrite data packets with a destination address in the subnet of 2.x.x.x to SVI1 (using virtual interface 310). According to the L2 MAC table 322 for the second switch linecard 302, the MAC address for BLADE 1, the first switch linecard 300, is 1.

During unicast forwarding according to embodiments of the invention and as illustrated in FIG. 3 as an example, L3 forwarding may occur on the ingress blade along with various input/output features, and then L2 bridging may occur on the output blade. First, an incoming data packet may be received from network 306 on interface $I_1$ in SVI1. An Access Control List (ACL) and Quality of Service (QoS) lookup may be performed on the input interface ($I_1$ in this example). ACL, as used herein, may be generally defined as a list of permissions attached to an object specifying who or what is allowed to access the object and what operations are permitted to be performed on the object. QoS, as used herein, may be generally defined as a resource reservation control mechanism, which can provide different priority to different users or data flows or guarantee a certain level of performance to a data flow in accordance with requests from the application program or the Internet Service Provider (ISP) policy.

After the ACL and QoS policies are established for the data packet, the ingress forwarding engine 312, such as EARL, may perform an FIB lookup into FIB 314. Since the packet has a destination address in the subnet of 1.x.x.x, the FIB adjacency may rewrite the packet to interface SVI2 through the virtual interface (V) 310 as described above. There need not be any output ACL/QoS policies on V 310, or any input ACL/QoS policies either. The egress forwarding engine 318 may perform a second FIB lookup, and FIB adjacency may rewrite the data packet to SVI2 through interface $I_6$ according to FIB 320. The data packet may then leave the blade switch 100 out of interface $I_6$ bound for network 308 with an IP address in the subnet of 1.x.x.x.

Conclusion

The blade switch may address interface scalability by having each of the linecards maintain its control/forwarding/management functions locally and uses the concept of virtual and local interfaces for intelligent forwarding. From the customer and network perspectives, the blade switch may appear as a single network switch having a single bridge ID. The blade switch may operate as a distributed L2 device with a single L3 interface, where one route processor (RP) interacts with multiple switch processors (SP).

While the foregoing is directed to embodiments of the present invention, other and further embodiments of the invention may be devised without departing from the basic scope thereof, and the scope thereof is determined by the claims that follow.

The invention claimed is:

1. A network switch system, comprising:
    a chassis;
    a plurality of switch linecards disposed in the chassis and functioning as independent Layer 2 (L2) switches, wherein each of the switch linecards maintains control, forwarding, and interface management functions locally, wherein a first group of switch linecards within the plurality of switch linecards are configured with a first operating system version, and wherein a second group of switch linecards within the plurality of switch linecards are configured with a second operating system version, distinct from the first operating system version; and
    a controller disposed in the chassis and configured to manage the plurality of switch linecards, wherein the controller is configured to provide an interface for configuring the network switch system, wherein the interface allows the first group of switch linecards to be configured and managed as a single entity, irrespective of the second group of switch linecards.

2. The system of claim 1, further comprising:
    responsive to a configuration operation using the interface, storing and maintaining, at each of the plurality of switch linecards, a respective forwarding information base (FIB), wherein each of the plurality of switch linecards is further configured to direct incoming packets, using the respective FIB, to (i) a local interface or (ii) a virtual interface of another switch linecard in the plurality of switch linecards, wherein the virtual interface is an internal local area network (LAN) segment connecting all of the plurality of switch linecards, and wherein the switch linecards in the plurality of switch linecards are configured to interact with one another using the virtual interfaces within the network switch system.

3. The system of claim 2, wherein each of the plurality of switch linecards is configured to download the respective FIB from the controller, and wherein a first one of the plurality of switch linecards is further configured to:
    receive data packets having destination addresses in a first subnet,
    determine that no local interface is available at the first switch linecard to transmit the data packets to the first subnet, based on the FIB at the first switch linecard,
    modify the data packets based on a media access control (MAC) address of a second one of the plurality of switch linecards, and
    transmit the modified data packets to the second switch linecards using a first virtual interface, wherein the second switch linecard is configured to undo the modification to the data packets and to transmit the data packets to the destination address in the first subnet using a local interface at the second switch linecard.

4. The system of claim 1, wherein the controller comprises a route processor (RP) configured to perform routing operations for Layer 3 (L3) traffic for the plurality of switch linecards, and wherein each of the plurality of switch linecards comprises a switch processor (SP).

5. The system of claim 1, wherein a first linecard of the plurality of switch linecards runs a different operating system than a second linecard of the plurality.

6. The system of claim 1, wherein a first linecard of the plurality of switch linecards runs a different version of a forwarding engine than a second linecard of the plurality.

7. The system of claim 1, wherein the system appears as the single network device from the control plane perspective and a management plane perspective.

8. The network switch system of claim 1, wherein the plurality of switch linecards appear and behave as a single network switch having a single bridge identifier that uniquely identifies the single network switch, from customer, control plane and data plane perspectives, prior to a configuration of the network switch system using the interface.

9. A method of configuring switch linecards in a network switch system, the network switch system comprising a plurality of switch linecards disposed in a chassis and functioning as independent Layer 2 (L2) switches, wherein each of the switch linecards maintains control, forwarding, and interface management functions locally, wherein a first group of switch linecards within the plurality of switch linecards are configured with a first operating system version, and wherein a second group of switch linecards within the plurality of switch linecards are configured with a second operating system version, distinct from the first operating system version, comprising:
    providing an interface for configuring switch linecards in the network switch system;
    receiving, via the interface, a configuration operation specifying the first group of switch linecards; and
    configuring the first group of switch linecards as a single entity, irrespective of the second group of switch linecards within the network switch system.

10. The method of claim 9, further comprising:
    responsive to receiving the configuration operation, transmitting, from a controller to each of the plurality of switch linecards, a respective forwarding information base (FIB), wherein each of the plurality of switch linecards is further configured to direct incoming packets, using the respective FIB, to (i) a local interface or (ii) a virtual interface of another switch linecard in the plurality of switch linecards, wherein the virtual interface is an internal local area network (LAN) segment connecting all of the plurality of switch linecards, and wherein the switch linecards in the plurality of switch linecards are configured to interact with one another using the virtual interfaces within the network switch system.

11. The method of claim 10, wherein a first one of the plurality of switch linecards is further configured to:
   receive data packets having destination addresses in a first subnet,
   determine that no local interface is available at the first switch linecard to transmit the data packets to the first subnet, based on the FIB at the first switch linecard,
   modify the data packets based on a media access control (MAC) address of a second one of the plurality of switch linecards, and
   transmit the modified data packets to the second switch linecards using a first virtual interface, wherein the second switch linecard is configured to undo the modification to the data packets and to transmit the data packets to the destination address in the first subnet using a local interface at the second switch linecard.

12. The method of claim 10, wherein each of the plurality of switch linecards is configured to maintain the respective FIB.

13. The method of claim 10, wherein the controller comprises a route processor (RP) configured to perform routing operations for Layer 3 (L3) traffic for the plurality of switch linecards, and wherein each of the plurality of switch linecards comprises a switch processor (SP).

14. The method of claim 11, wherein the local interface of the second switch linecard is a switch virtual interface (SVI).

15. The method of claim 11, wherein forwarding the packet comprises unicast forwarding.

16. A computer program product for configuring switch linecards in a network switch system, the network switch system comprising a plurality of switch linecards disposed in a chassis and functioning as independent Layer 2 (L2) switches, wherein each of the switch linecards maintains control, forwarding, and interface management functions locally, wherein a first group of switch linecards within the plurality of switch linecards are configured with a first operating system version, and wherein a second group of switch linecards within the plurality of switch linecards are configured with a second operating system version, distinct from the first operating system version, comprising:
   computer code that provides an interface for configuring switch linecards in the network switch system;
   computer code that receives, via the interface, a configuration operation specifying the first group of switch linecards;
   computer code that configures the first group of switch linecards as a single entity, irrespective of the second group of switch linecards within the network switch system; and
   a non-transitory computer-readable medium that stores the computer codes.

17. The computer program product of claim 16, further comprising:
   computer code that transmits, responsive to receiving the configuration operation, from a controller to each of the plurality of switch linecards, a respective forwarding information base (FIB), wherein each of the plurality of switch linecards is further configured to direct incoming packets, using the respective FIB, to (i) a local interface or (ii) a virtual interface of another switch linecard in the plurality of switch linecards, wherein the virtual interface is an internal local area network (LAN) segment connecting all of the plurality of switch linecards, and wherein the switch linecards in the plurality of switch linecards are configured to interact with one another using the virtual interfaces within the network switch system.

18. The computer program product of claim 17, wherein a first one of the plurality of switch linecards is further configured to:
   receive data packets having destination addresses in a first subnet,
   determine that no local interface is available at the first switch linecard to transmit the data packets to the first subnet, based on the FIB at the first switch linecard,
   modify the data packets based on a media access control (MAC) address of a second one of the plurality of switch linecards, and
   transmit the modified data packets to the second switch linecards using a first virtual interface, wherein the second switch linecard is configured to undo the modification to the data packets and to transmit the data packets to the destination address in the first subnet using a local interface at the second switch linecard.

19. The computer program product of claim 17, wherein the controller comprises a route processor (RP) configured to perform routing operations for Layer 3 (L3) traffic for the plurality of switch linecards, wherein each of the plurality of switch linecards comprises a switch processor (SP), and wherein each of the plurality of switch linecards is configured to maintain the respective FIB.

* * * * *